United States Patent [19]

Bedford

[11] 4,376,319
[45] Mar. 15, 1983

[54] MAINTENANCE LIP LOCK

[75] Inventor: Robert C. Bedford, Milwaukee, Wis.

[73] Assignee: Kelley Company Inc., Milwaukee, Wis.

[21] Appl. No.: 256,693

[22] Filed: Apr. 23, 1981

[51] Int. Cl.³ .............................................. E01D 1/00
[52] U.S. Cl. .................................................. 14/71.3
[58] Field of Search ...................... 14/71.3, 71.1, 71.7

[56] References Cited
U.S. PATENT DOCUMENTS

| | | | |
|---|---|---|---|
| 3,117,332 | 1/1964 | Kelley | 14/71.3 |
| 3,235,896 | 2/1966 | Riggs | 14/71.3 |
| 3,323,158 | 6/1967 | Loomis | 14/71.3 |
| 3,327,335 | 6/1967 | Beckwith | 14/71.3 |
| 3,444,574 | 5/1969 | LeClear | 14/71.3 |
| 3,699,601 | 10/1972 | Hecker | 14/71.3 |
| 3,728,753 | 4/1973 | Beckwith | 14/71.3 |
| 4,010,505 | 3/1977 | Bouman | 14/71.3 |
| 4,068,338 | 1/1978 | Artzberger | 14/71.3 |

OTHER PUBLICATIONS

Instruction Decal 138-726 by Kelley Company.
Owners Manual for M6054 Dockleveler by Kelley Company, dated Feb. 1, 1980–Pertinent pages are 9 and 10.

Primary Examiner—Nile C. Byers, Jr.
Attorney, Agent, or Firm—Andrus, Sceales, Starke & Sawall

[57] ABSTRACT

An improved maintenance assembly for a dockboard having a ramp and a hinged lip. The maintenance assembly includes a lip locking member which is slidably contained in a bracket attached to the bottom of the ramp. A spring connected to the lip locking member urges the locking member into its stored position. When the lip locking member is extended to engage the bottom of the lip and hold it in an elevated position, the lip locking member engages the lip hinge and pivots slightly to bring a detent into engagement with the bracket and thus lock the lip locking member in its operative position.

10 Claims, 4 Drawing Figures

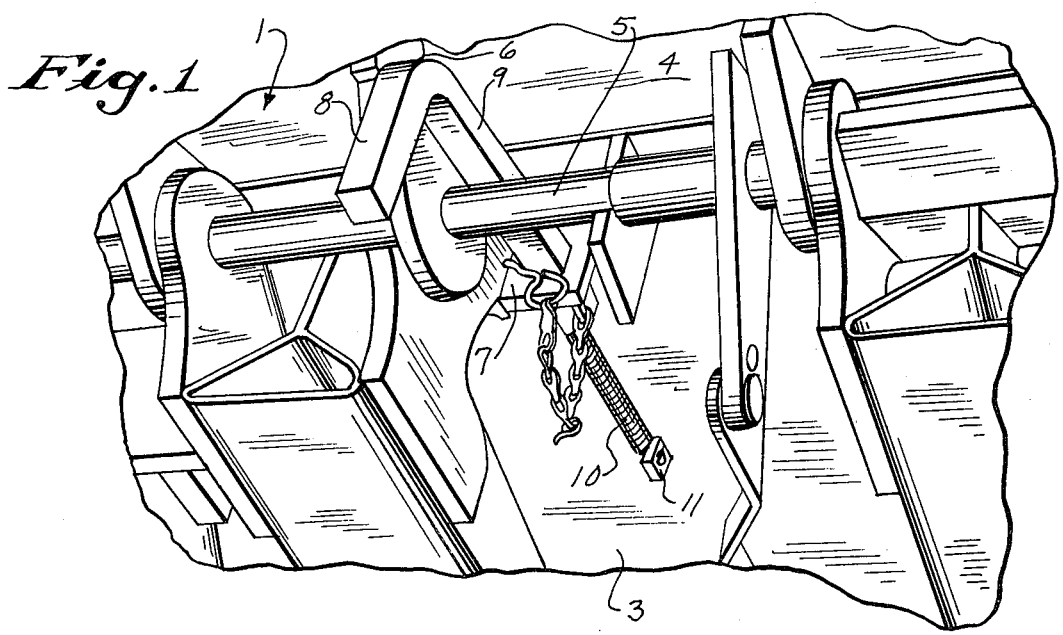
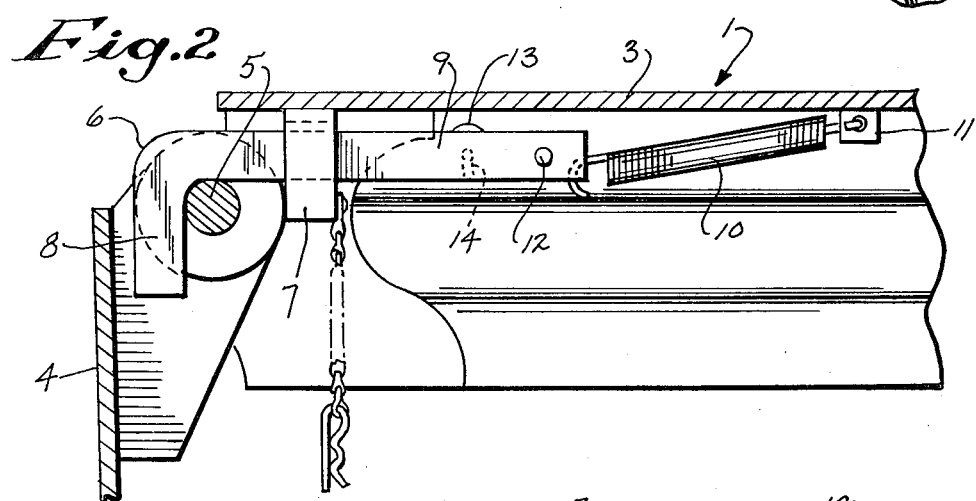
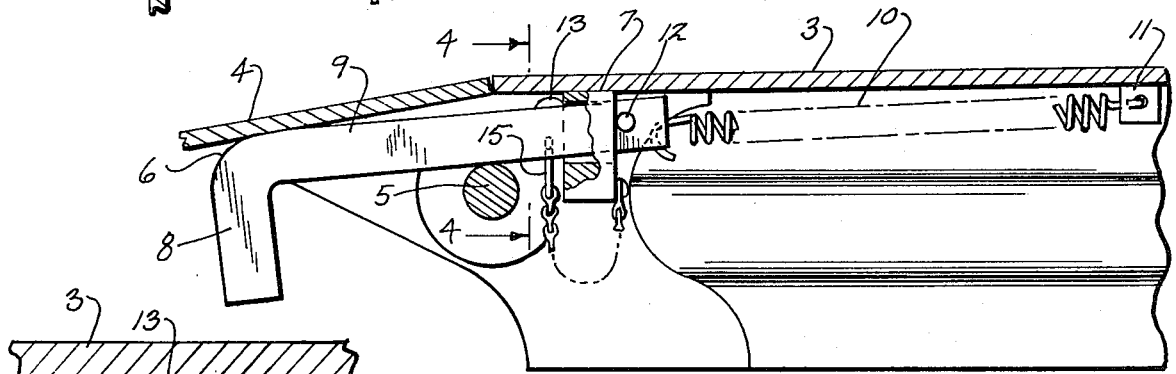
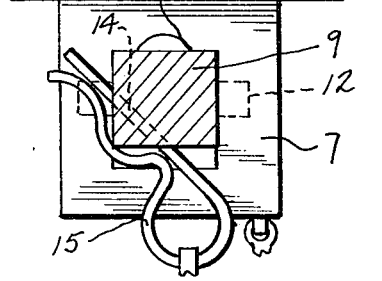

MAINTENANCE LIP LOCK

BACKGROUND OF THE INVENTION

Typically, an adjustable dockboard of the type shown in U.S. Pat. No. 4,068,338, consists of a frame or supporting structure which is mounted within a pit in the loading dock. A ramp is pivoted to the frame and is movable between a generally horizontal cross traffic position and an upwardly inclined position, and a lip, which is hinged on the forward edge of the ramp, is pivotable between a downwardly hanging pendant position and an extended position. With an upwardly biased dockboard, a holddown mechanism is utilized which permits downward movement of the ramp as the ramp is "walked-down" by the operator, but prevents upward movement of the ramp, unless released.

The space between the frame and the ramp normally contains the operating equipment for the dockboard, such as the ramp elevating mechanism, the lip extending and latching mechanism, the holddown mechanism, and the like.

During the course of use it becomes necessary to obtain access to this space beneath the lip in order to service or provide routine maintenance for the various components located beneath the forward edge of the ramp or for the lip itself. Therefore, it is necessary, when providing service or maintenance, to hold the lip in the extended position.

In the past the lip has been held in the extended position either manually or by a lip locking member slidably mounted in a bracket attached to the bottom surface of the ramp. The lip locking member was held in its operative position by a manually positioned locking pin. The locking member also had to be manually moved to and locked in its storage position. This resulted in occasions where the lip was not completely moved to its stored position or where it was not locked in its stored position, causing the lip to remain slightly extended. When a truck would back into this sightly extended lip, the lip lock could be bent or otherwise damaged so as to necessitate repair or replacement.

SUMMARY OF THE INVENTION

This invention is directed to an improved maintenance assembly for a dockboard and more particularly to a lip locking device for holding the dockboard lip in an extended position. In accordance with the invention, the assembly includes a lip locking member slidably contained in a bracket attached to the bottom surface of the ramp. A spring urges the lip locking member into its stored position.

In accordance with another aspect of the invention the lip locking member is provided with a detent device that holds the lip locking member in its operative position. The detent device consists of a screw disposed within the lip locking member with the head of the screw protruding from the lip locking member.

In operation the lip locking member is pulled out to its operative position where it engages the bottom surface of the lip which is in its extended position. The downward pressure of the lip forces the lip locking member into engagement with the lip hinge. The lip locking member then pivots slightly about the hinge to bring the detent device into engagement with the bracket. Upon completion of the work beneath the lip, the detent device is disengaged and the spring automatically returns the lip locking member to its stored position and maintains it in that position.

The present invention thus provides a lip locking assembly that automatically locks in an operative position once it engages the extended lip and that automatically returns to and maintains its stored position when not in use.

BRIEF DESCRIPTION OF THE DRAWINGS

The drawings illustrate the best mode presently contemplated of carrying out the invention.

In the drawings:

FIG. 1 is a partial perspective view of a dockboard incorporating the lip locking assembly of the present invention;

FIG. 2 is a side sectional view of the lip locking assembly of the present invention in the stored position;

FIG. 3 is a side sectional view of the lip locking assembly of the present invention in the operative position away;

FIG. 4 is a section taken along line 4—4 of FIG. 3;

DETAILED DESCRIPTION OF THE PREFERRED EMBODIMENT

The maintenance assembly of the present invention is shown in FIG. 1 in use with a dockboard 1 having a ramp 3 and a lip 4 connected to the front edge of the ramp 3 by hinge assembly 5. The dockboard 1 can be constructed similar to that shown in U.S. Pat. No. 4,068,338. The maintenance assembly consists of lip locking member 6 slidably mounted within a slot in bracket 7 which is attached to the bottom surface of ramp 3. Lip locking member 6 consists of a generally L-shaped member having a handle section 8 and a lip supporting section 9. The slot in bracket 7 has a height greater than the vertical cross-section of lip supporting section 9 so that lip supporting section 9 can move vertically within the slot.

One end of a spring 10 is connected to the end of lip supporting section 9 and the other end of spring 9 is connected to a rib 11 attached to the bottom surface of ramp 3. Spring 10 acts to return lip locking member 6 to its stored position (FIG. 2) and to maintain it in that position.

The end of lip supporting section 9 also contains a limit pin 12 that extends out from lip locking member 6 and abuts bracket 7 when locking member 6 is moved to its operative position (FIG. 3), thus preventing locking member 6 from becoming disengaged from bracket 7.

Also disposed within the end of lip supporting section 9 is a detent device consisting of a screw with the screw head or abutment 13 protruding from the surface of lip supporting section 9. When locking member 6 is in its operative position (FIG. 3), abutment 13 abuts bracket 7 and prevents spring 10 from returning locking member 6 to its stored position (FIG. 2).

The end of lip supporting section 9 also contains a hole 14 which is angularly disposed in lip supporting section 9. A locking pin 15 may be placed in hole 14 when locking member 6 is in its operative position as an added precautionary measure to prevent return of locking member 6 to its stored position should abutment 13 be accidentally disengaged from bracket 7.

As seen in FIG. 2 locking member 6 is normally retained in its stored position by the tension of spring 10. In this stored position, locking member 6 rests on bracket 7 and hinge 5.

When it is desired to hold lip 4 in an extended position for servicing or maintenance, locking pin 15 is removed from hole 14 and locking member 6 is pulled out to its operative position (FIG. 3). The height of the slot in bracket 7 is such that it will allow the passage of lip supporting section 9 and protruding abutment 13. Lip 4 is then lowered onto lip supporting section 9 and locking member 6 pivots slightly about hinge 5, counter clock-wise as viewed in FIG. 3, to bring abutment 13 into engagement with bracket 7. The engagement of abutment 13 with bracket 7 prevents spring 10 from pulling locking member 6 back into its stored position. As an added precaution pin 15 may be inserted back into hole 14 to insure that locking member 6 will not be snapped back to its stored position even if abutment 13 should become disengaged from bracket 7.

After lip 4 has been serviced and it is desired to return it to its pendant position, pin 15 is removed from hole 14 and a slight upward force, such as an upward tap to handle section 8, is applied to locking member 6. This causes the forward end of locking member 6 to pivot upwardly about hinge pin 14, thereby moving the rear portion of section 9 and abutment 13 downwardly to disengage abutment 13 from bracket 7 and allowing spring 10 to return locking member 6 to its fully stored position.

Various modes of carrying out the invention are contemplated as being within the scope of the following claims, particularly pointing out and distinctly claiming the subject matter which is regarded as the invention, I claim:

1. A maintenance assembly for a dockboard having a ramp and a lip hinged to the forward edge of the ramp and movable between a pendant position and an extended position, comprising a lip supporting member for holding the lip in the extended position; mounting means for supporting said lip supporting member in movement beneath the ramp from a stored position wherein said lip supporting member is disposed beneath the ramp to an operative position wherein said lip supporting member engages the under surface of the lip to lock the lip in the extended position; biasing means connected to said lip supporting member and urging said lip supporting member to said stored position, and locking means connected to said lip supporting member for locking said lip locking member in said operative position.

2. The maintenance assembly defined in claim 1, wherein said lip supporting member comprises a a rearwardly extending lip supporting section slidably contained in said mounting means and a forward handle section disposed at an angle to said lip supporting section.

3. The maintenance assembly defined in claim 1 wherein said mounting means comprises a bracket connected to the under surface of the ramp, said bracket having an opening therein with said lip supporting member slidably contained in said opening.

4. The mainenance assembly defined in claim 1 wherein said locking means comprises an abutment disposed on said lip supporting member, said abutment protruding from said lip supporting member and urged into engagement with said mounting means by the pivotal movement of said lip supporting member about the lip hinge upon engagement of said lip supporting member with said extended lip.

5. The maintenance assembly defined in claim 1 wherein said biasing means comprises a spring having one end attached to the underside of the ramp and having the other end connected to said lip supporting member.

6. The maintenance assembly defined in claim 2, wherein said lip supporting section has at least one hole along its length and further comprising a retaining member selectively engageable with said hole, engagement of said retaining member with said hole maintaining said lip supporting member in its operative position.

7. A maintenance assembly for a dockboard having a ramp and a lip hinged to the forward edge of the ramp and movable between a pendant position and an extended position, comprising a bracket connected to the under surface of the ramp; a lip supporting member slidably contained in said bracket, said lip supporting member being movable between a stored position wherein said lip supporting member is disposed beneath the ramp and an operative position wherein said lip supporting member engages the under surface of the lip to lock the lip in the extended position; biasing means connected to said lip supporting member and urging said lip locking member to said stored position; and locking means connected to said lip supporting member and engageable with said bracket to lock said lip locking member in said operative position.

8. A maintenance assembly for dockboard having a ramp, and a lip hinged to the forward edge of the ramp, the lip being pivotally movable between a pendant position and an extended position, comprising a bracket connected to the under surface of the ramp and having an opening therein; a lip supporting member having a foward handle section and a rearwardly extending lip supporting section slidably contained in said opening, said opening having a greater height than the vertical cross-section of said lip supporting section whereby said lip supporting section may move vertically in said opening, said lip supporting member being movable in a forward-aft direction between a stored position wherein said lip supporting member is disposed beneath the ramp and an operative position wherein said lip supporting member engages the under surface of the lip to lock the lip in the extended position; biasing means connected to said lip supporting member and urging said lip supporting member to said stored position; and an abutment disposed on said lip supporting section, said abutment protruding from the upper surface of said lip supporting section, whereby upon engagement of said lip supporting member with the extended lip, said lip supporting section is urged ito engagement with the lip hinge causing the lip supporting member to pivot about the hinge and bring said abutment into engagement with said bracket to lock said lip supporting member in said operative position.

9. A maintenance assembly for a dockboard having a ramp and a lip hinged to the forward edge of the ramp and movable between a pendant position and an extended position, comprising a lip supporting member for holding the lip in the extended position, means for supporting said lip supporting member in movement beneath the ramp from a stored position wherein said lip supporting member is disposed beneath the ramp to an operative position wherein said lip supporting member engages the under surface of the lip to lock the lip in the extended position; locking means movable between a locking position wherein said lip supporting member is locked in said operative position: and a released position, and means responsive to the weight of the lip being applied to said lip supporting member when the lip supporting member is in the operative position for moving said locking means from the released position to said locking position whereby inward movement of said lip supporting member is prevented.

10. A maintenance assembly for a dockboard having a ramp and a lip connected to the forward edge of the ramp by a hinge pin and pivotally movable between a pendant position and an extended position, comprising a bracket connected to the under surface of the ramp and having an opening therein; a lip supporting member slidably contained in said opening and positioned above said hinge pin, said lip supporting member being movable between a stored position wherein said lip supporting member is disposed beneath the ramp and an operative position wherein said lip supporting member extends out beyond the hinge pin and engages the under surface of the lip and supports the lip in an extended position; biasing means connected to said lip supporting member and urging said lip supporting member to said stored position; and an abutment disposed on the upper surface of the rearward portion of said lip supporting member whereby when said lip supporting member is in said stored position said abutment is positioned behind said bracket and when said lip supporting member is moved to said operative position said abutment is moved through said bracket opening and positioned in front of said bracket whereby the engagement of the lip with said lip supporting member causes said lip supporting member to pivot about the hinge pin and bring said abutment into engagement with said bracket to prevent rearward movement of said lip supporting member.

* * * * *

UNITED STATES PATENT AND TRADEMARK OFFICE
CERTIFICATE OF CORRECTION

PATENT NO. :   4,376,319
DATED      :   March 15, 1983
INVENTOR(S) :  ROBERT C. BEDFORD It is certified that error appears in the above-identified patent and that said Letters Patent is hereby corrected as shown below:

Col. 4, Line 66, CLAIM 9, After "position" delete ":" (colon)

Signed and Sealed this

Nineteenth Day of July 1983

[SEAL]

Attest:

GERALD J. MOSSINGHOFF

Attesting Officer   Commissioner of Patents and Trademarks